United States Patent [19]
Perennes

[11] Patent Number: 5,694,372
[45] Date of Patent: Dec. 2, 1997

[54] SONAR SYSTEM FOR CURRENT METER AND DOPPLER LOG

[75] Inventor: Marc Perennes, Brest, France

[73] Assignee: Thomson-CSF, Paris, France

[21] Appl. No.: 600,926

[22] PCT Filed: Aug. 19, 1994

[86] PCT No.: PCT/FR94/01015

§ 371 Date: Feb. 28, 1996

§ 102(e) Date: Feb. 28, 1996

[87] PCT Pub. No.: WO95/06885

PCT Pub. Date: Mar. 9, 1995

[30] Foreign Application Priority Data

Aug. 31, 1993 [FR] France ................... 93 10389

[51] Int. Cl.[6] ........................................ G01S 15/60
[52] U.S. Cl. ...................... 367/91; 367/90; 367/153; 73/170.13
[58] Field of Search ..................... 367/89, 90, 91, 367/153, 155; 73/170.13

[56] References Cited

U.S. PATENT DOCUMENTS

| | | | |
|---|---|---|---|
| 3,618,006 | 11/1971 | Wright | 367/173 |
| 3,924,259 | 12/1975 | Butler et al. | 367/138 |
| 4,104,912 | 8/1978 | Clavelloux et al. | 73/170.13 |
| 4,138,657 | 2/1979 | Shave | 367/91 |
| 4,270,191 | 5/1981 | Peynaud | 367/91 |

Primary Examiner—Ian J. Lobo
Attorney, Agent, or Firm—Oblon, Spivak, McClelland, Maier & Neustadt, P.C.

[57] ABSTRACT

A sonar antenna with transducers symmetrically distributed along an axis (fore/aft axis) and a perpendicular axis (starboard/port axis) in a plane on a circular base. Placement and polarities of the transducers, along with a phase and sequence of feeding two distinct frequencies to the transducers create four emission lobes inclined at 30 degrees one emission lobe with respect to each axis. Summation of reception signals (echos) from selected transducers based on frequency and accounting for time allow for the determination of fore/aft and starboard/port reception signals from which a velocity of the antenna or a vehicle attached to the antenna can be calculated.

6 Claims, 7 Drawing Sheets

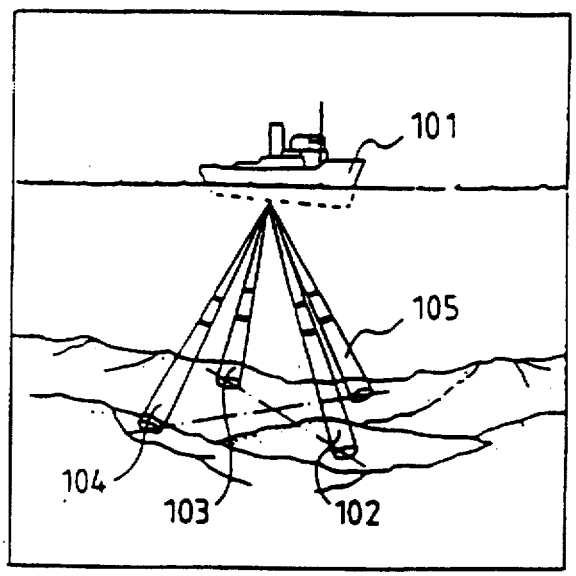
FIG.1
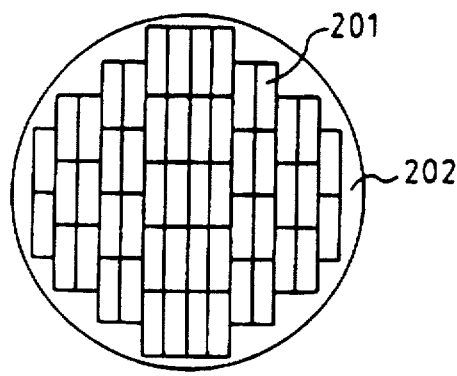
FIG.2
| Row | 1 | 2 | 3 | 4 | 5 | 6 | 7 | 8 | 9 | 10 | |
|---|---|---|---|---|---|---|---|---|---|---|---|
| Phase | + | + | − | − | + | + | + | − | + | + | |
| Sequence 1 | A | B | A | B | A | B | A | B | A | B | Frequency F1 |
| Sequence 2 | A′ | −B′ | A′ | −B′ | A′ | −B′ | A′ | −B′ | A′ | −B′ | Frequency F2 |
FIG.3

| Sequence 1 | 0 | 90 | 180 | -90 | 0 | 90 | 180 | -90 | 0 | 90 |
| Sequence 2 | 0 | -90 | 180 | 90 | 0 | -90 | 180 | 90 | 0 | -90 |
| Row | 1 | 2 | 3 | 4 | 5 | 6 | 7 | 8 | 9 | 10 |

| Phase | 0 | 0 | 180 | 180 | 0 | 0 | 180 | 180 | 0 | 0 |
| Row | 1 | 2 | 3 | 4 | 5 | 6 | 7 | 8 | 9 | 10 |

| GROUP | pulse 1<br>Fore<br>Beam | pulse 2<br>Aft<br>Beam | pulse 3<br>Starboard<br>Beam | pulse 4<br>Port<br>Beam |
|---|---|---|---|---|
| 1 | A | A' | A | A' |
| 2 | A | A' | -A | -A' |
| 3 | B | -B' | A | A' |
| 4 | B | -B' | -A | -A' |
| 5 | A | A' | B | -B' |
| 6 | A | A' | -B | B' |
| 7 | B | -B' | B | -B' |
| 8 | B | -B' | -B | B' |
| Frequ. | F1 | F2 | F1 | F2 |

SONAR SYSTEM FOR CURRENT METER AND DOPPLER LOG

BACKGROUND OF THE INVENTION

1. Field of the Invention

The present invention relates to sonar systems which make it possible either to measure the currents within the water, thus forming a current meter, or to measure the speed with respect to the sea bed of the boat on which such a sonar is mounted, thus producing a Doppler log.

2. Discussion of the Background

These known apparatuses are very much alike and both operate by measuring the Doppler effect on the acoustic waves backscattered either by the sea bed or by the water strata. Any differences between the two apparatuses lie in regard to the electronics for processing the signal received and possibly in regard to the frequencies used.

These apparatuses are usually designed according to the so-called Janus configuration represented diagrammatically in FIG. 1, in which the acoustic antenna fixed under the hull of a boat 101 is used to emit 4 acoustic beams 102 to 105. The two beams 102 and 103 are inclined with respect to the vertical by an angle α respectively fore and aft of the boat in a vertical plane parallel to the axis of this boat. This makes it possible to obtain the longitudinal speed of the boat with respect to the sea bed, or the speed of the marine currents over the depth of water between the surface and the sea bed. The other two beams 104 and 105 are themselves inclined by an angle α but to port and to starboard of the boat in a vertical plane perpendicular to the axis of the boat and hence to the previous plane. The lateral speed of the boat or of the marine currents is thus obtained. Combining these two speeds therefore gives the true speed together with the drift angle.

SUMMARY OF THE INVENTION

The main drawback of this device is that, to form these beams, a set of plane transducers oriented in the requisite direction is generally used for each beam, that is to say in total one antenna formed by 4 sectors substantially forming the 4 faces of a relatively flat pyramid. This antenna is therefore of relatively large size, this generally requiring a fairly big hole to be made in the hull in order to fix a thick liquid-filled housing containing the antenna. This housing communicates with the exterior via an acoustic window. This device is a potential source of leaks.

To obviate these drawbacks, the invention proposes a sonar system for current meter and Doppler log, which comprises a set of transducers situated on a plane base intended to be fixed horizontally on the bottom of the hull of a carrier boat, and means for feeding these transducers with signals exhibiting a first and second successive distinct frequencies and phases making it possible to obtain in at least a first plane perpendicular to the plane of the base, a first emission lobe at the first frequency forming an angle α with the perpendicular to the plane of this base and a second emission lobe at the second frequency forming an angle −α with this perpendicular, and means of summation of the signals received by the transducers in order to obtain two reception signals in the emission plane separated by their frequencies, principally characterized in that the transducers are aligned in rows spaced apart by a distance d and grouped in twos with a feed polarity inverted from one group to the next, and that the feed means make it possible to deliver, for each frequency, signals A and B which are 90° out of phase, these signals being delivered to the transducers in a first sequence A, B, A, B . . . with the first frequency and in a second sequence A', −B', A', −B'. . . with the second frequency; these two sequences determining the two emission lobes.

BRIEF DESCRIPTION OF THE DRAWINGS

Other features and advantages of the invention will emerge clearly in the following description given by way of non-limiting example with regard to the appended figures which represent:

FIG. 1 a perspective view of a boat fitted with a four-beam sounder;

FIG. 2 a plan view of an antenna according to the invention in a one-dimensional mode;

FIG. 3 a feed scheme for the transducers of the antenna of FIG. 2;

DESCRIPTION OF THE PREFERRED EMBODIMENTS

For the sake of clarity and simplicity the invention will firstly be expounded in the case in which the system uses only two lobes, for example the fore/aft lobes 102 and 103 of FIG. 1.

Represented in FIG. 2 is an example of an acoustic antenna formed by transducers arranged in this example on a circular surface for the sake of ease of manufacture of the base supporting this antenna. This shape is of secondary interest only and does not come within the invention. The antenna could very well have for example a square or rectangular shape, this geometry influencing only the aperture of the main lobe and the level of the side lobes of the radiation diagram of the acoustic waves emitted and received.

In this example, the antenna is formed by a set of rows of transducers 201 distributed over the circular base 202 so as to occupy a maximum of area of the latter.

These rows are spaced apart by around half the wavelength at the working frequency, and the number of them is determined, in a known manner, by the width desired for the angular aperture of the main lobes.

According to the invention, the rows are grouped in twos and each group of rows is 180° out of phase with respect to the adjacent groups. This phase shift can be obtained in a simple manner by inverting the polarity of the feed conductors for the rows.

A first pulse of frequency F1 and a second pulse of frequency F2 are emitted successively so as to allow the successive emission of two main lobes inclined on either side of the vertical by an angle α, generally equal to 30°, like the lobes 102 and 103 in FIG. 1. By feeding the rows of the antenna according to the method described below, in accordance with the invention, the first pulse will make it possible to form the foreward inclined lobe whereas the second inclination will allow the formation of the lobe inclined aftward symmetrically with respect to the vertical.

To do this use is made of the electrical signals at the desired frequencies, these signals being available with a 90° phase shift in respect of each of these two frequencies. Calling A and B, and A' and B' the signals which are 90° out of phase respective of frequency F1 and frequency F2, the requisite lobes are obtained by applying these signals to the electro-acoustic transducers of the rows in accordance with the two sequences represented schematically in FIG. 3.

In this figure the distance d between the rows is, as described above, equal to half the wavelength at the working frequency. The phases represented correspond to those obtained by inverting the feed to the rows as described above.

Figure 4:
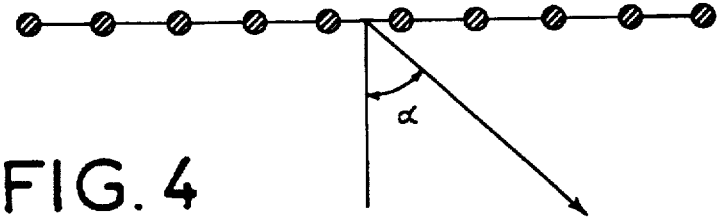
FIG. 4 a representation of the phases corresponding to FIG. 3.

Under these conditions the phase of the signals actually applied to the transducers of the rows is that represented in FIG. 4.

A directivity diagram is thus obtained which exhibits a lobe in a direction α, given in a known manner by:

$$\sin\alpha = \frac{\phi}{2\pi\frac{d}{\lambda}}$$

In this formula λ is the working wavelength, d the distance between two adjacent rows and φ the electric phase shift between two adjacent columns.

When the rows are actually separated by λ/2, for sequence 1 the main lobe is +30° off-aim foreward and for sequence 2 this lobe is −30° off-aim aftward (with respect to the vertical).

If, however, for particular purposes the aim-off angle α is required to be different from 30°, it suffices to separate the rows by a distance different from $$\frac{\lambda}{2}$$

and such that:

$$\sin\alpha = +/- \frac{\lambda}{4d} \qquad (2)$$

Figure 5:
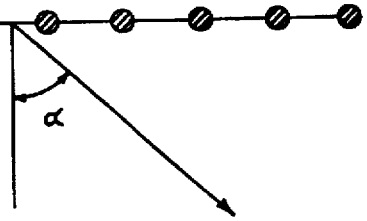
FIG. 5 a distribution scheme for the phases at reception.

Taking into account the 180° phase shift between each group of two rows, the phase law at reception is represented in FIG. 5.

This configuration is equivalent to that of an antenna which includes half as many rows spaced apart by a wavelength and out of phase by 0 or 180°.

Hence, by carrying out direct addition of the signals obtained by the transducers at reception, a reception diagram which includes two symmetrical main lobes at +/−α, here +/−30°, with respect to the vertical, is therefore obtained automatically.

Of course, this direct addition gives a single reception signal in which that which corresponds to the foreward emitted frequency must be differentiated from that which corresponds to the aftward emitted frequency. This is done very simply, since the foreward emitted frequency F1 is different from the aftward emitted frequency F2. The frequencies received are of course displaced by the Doppler shift in each of the directions, but in view of the speeds used in maritime navigation these shifts are relatively small, and by using sufficiently distinct emission frequencies there is no risk of the overlapping of the spectra at reception and the separation of the signals corresponding to fore and to aft is very easy to obtain by simple filtering.

Figure 6:
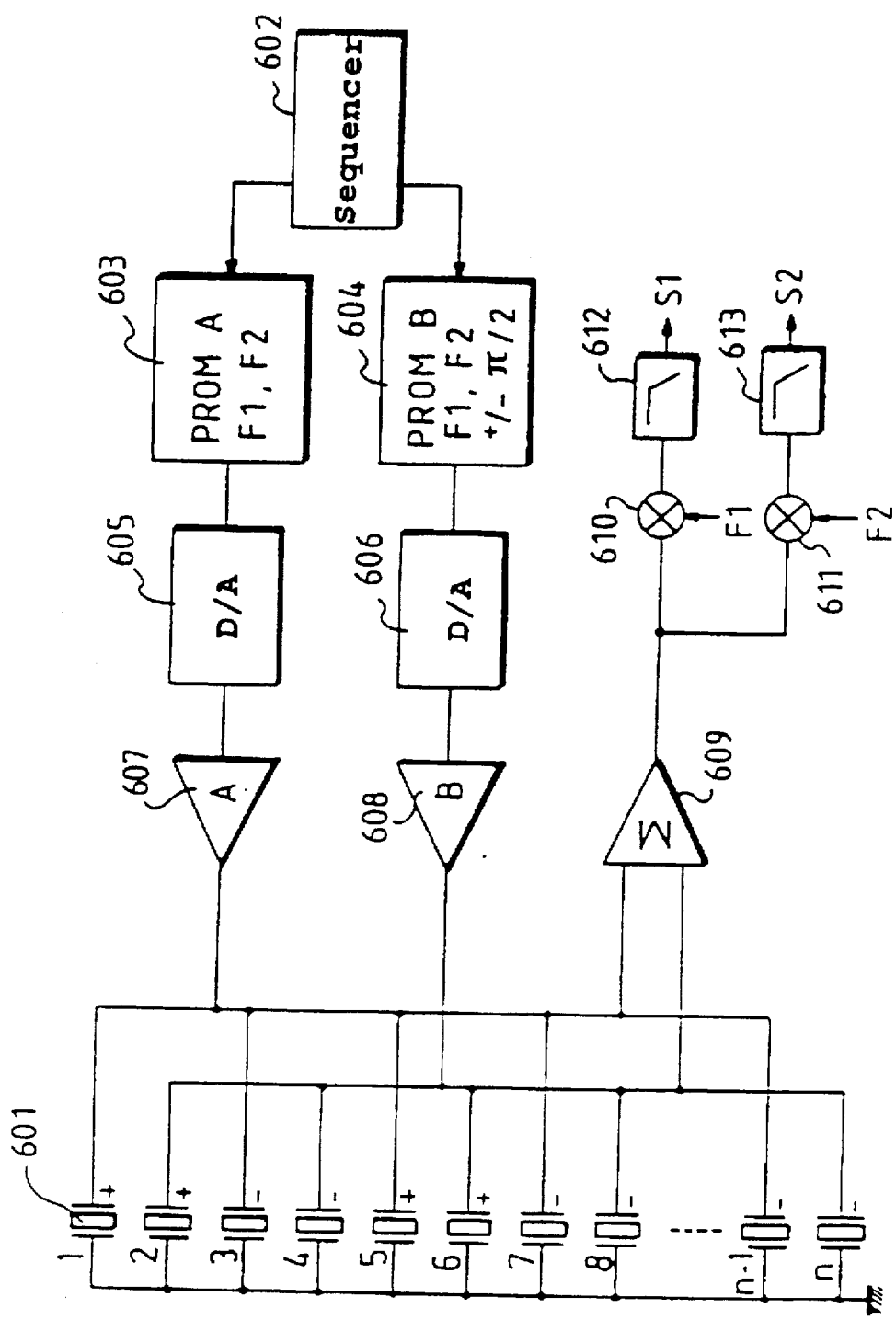
FIG. 6 a schematic layout of an emission and reception system adapted to the antenna of FIG. 2.

Represented in FIG. 6 is a simplified layout of the electronic system making it possible to emit and receive the signals on such an antenna.

A sequencer 602 makes it possible to obtain the succession of signals in the requisite order. To do this, it instructs the reading of two PROM type memories 603 and 604 which contain, in a known digital form, the frequencies to be obtained together with the necessary phases.

The PROM 603 corresponds to the signals A and A', that is to say to the frequencies F1 and F2 which are not out of phase, and the PROM 604 corresponds to the signals B and B', that is to say to the signals F1 and F2 which are +/−

$$\frac{\pi}{2}$$

out of phase.

These PROMs are therefore read under instruction from the sequencer 602 which makes it possible to obtain the sequences 1 and 2 defined in FIG. 3 and to have them emitted successively while complying, between each burst, with the time required to receive the sonar pulses, in a known manner.

The digital signals from these PROMs are converted into analog in two digital/analog converters 605 and 606. These analog signals are next amplified in amplifiers 607 and 608, which each feed a set of transducer rows 601 forming the antenna. These sets are distributed as defined above with the polarities inverted, also as defined above.

For reception, all the rows of transducers 601 are joined to an amplifier/summing unit 609 which feeds two mixers 610 and 611, each of which is thus fed respectively with the frequencies F1 and F2 acting as local oscillator in order to demodulate the signals received. The baseband signals thus obtained are next filtered in filters 612 and 613 respectively which make it possible to eliminate the parasitic crossmodulation signals, in particular those corresponding to the other channel.

The sonar signals S1 and S2 corresponding to the two pathways, fore and aft, of the log or of the current meter are thus obtained on the outputs S1 and S2 of these filters.

Apart from the advantage of having a flat antenna of restricted dimensions which can be installed easily in a housing of small thickness with no acoustic window and situated flush with the hull of the carrier ship, the invention also offers the advantage that the relation linking the speed to be measured and the Doppler shift characteristic of this speed independent of the acoustic wave speed in the propagation medium.

In fact relation 1 can be written in the form:

$$\frac{\sin\alpha}{c} = \frac{\phi}{2\pi f d} = Const.$$

The relation between the Doppler shift Fd and the speed V to be measured is therefore given by, Fe being the measurement frequency and c the acoustic wave speed in the propagation medium;

$$Fd = Fe \times 2V \times \frac{\sin\alpha}{c} = Fe \times 2V \times Const.$$

It is observed that in this formula the speed c disappears.

The system just described in respect of fore/aft beams applies in respect of any orientation of the antenna, which could just as well be starboard/port.

Figure 7:
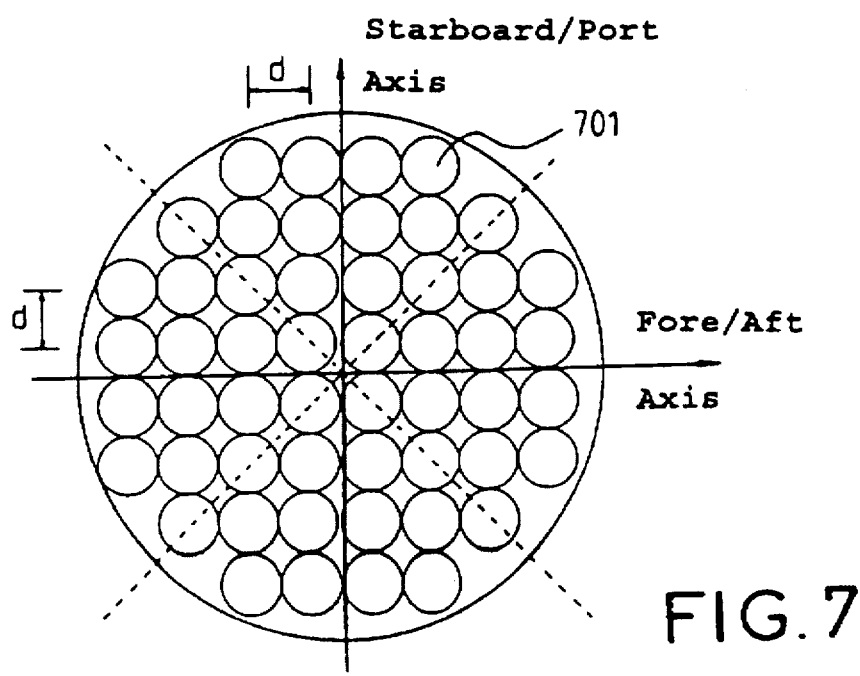
FIG. 7 a plan view of an antenna according to the invention in the two-dimensional case.

To extend the invention to a system making it possible to obtain the 4 fore/aft and port/starboard beams simultaneously, it is proposed to use an antenna similar to that of FIG. 7, in which n transducers 701, here 52, are spaced regularly apart with a spacing d, preferably equal to half the wavelength at the working frequency, along the two main axes fore/aft and starboard/port. The shape of this antenna could be arbitrary, but in order to simplify the embodiment, in particular so as to obtain relatively regular and symmetrical lobes, it will be beneficial to retain a symmetry not only with respect to the main axes thus defined but also with respect to the diagonals at +/−45° to these main axes. In the example described, the antenna is circular and is formed of 52 transducers which are themselves circular.

A first solution can be to obtain the fore/aft and the starboard/port beams separately, and so on.

Figure 8:
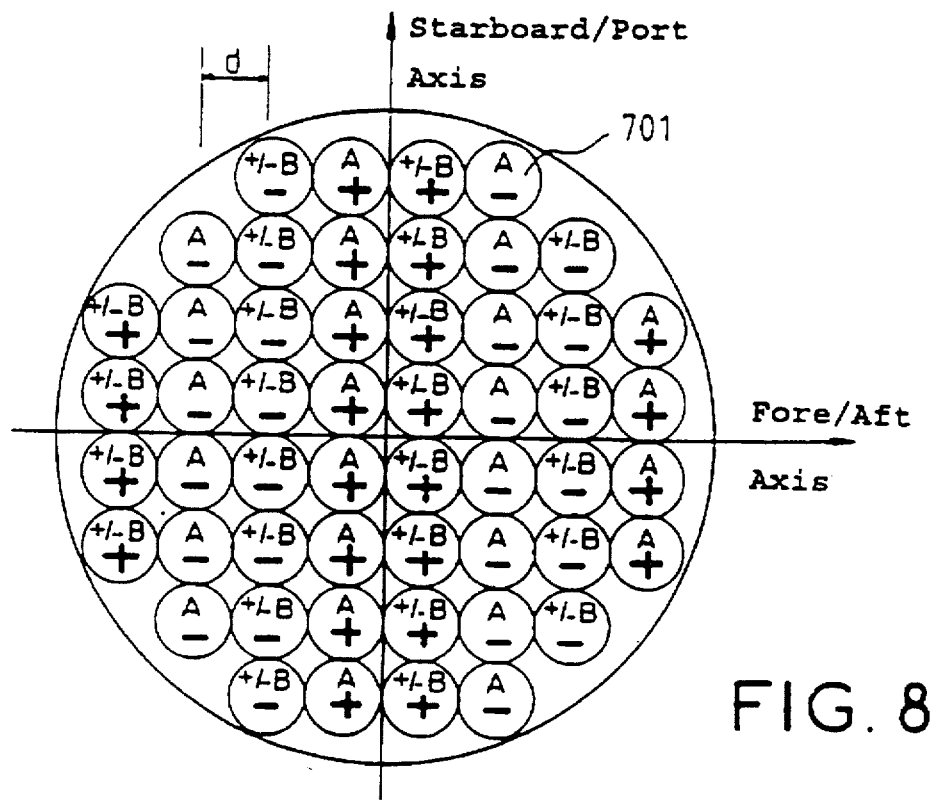
FIG. 8 a feed scheme for the antenna of FIG. 7 for obtaining fore/aft emission lobes.

To do this, the transducers may be fed as represented in FIG. 8. The bold + and − signs correspond to the feed polarities of the transducers and the letters A and +/− B correspond to the electrical signals A/A' and B/B' applied to these transducers in accordance with the previous definition. It is thus observed that the antenna and the beams obtained are strictly equivalent to those described above.

By turning the antenna by 90°, starboard/port oriented beams will be obtained in the same manner. Of course, mechanical rotation is quite useless and the same result may be obtained by modifying the feed to the transducers in the manner represented in FIG. 9.

Figure 9:
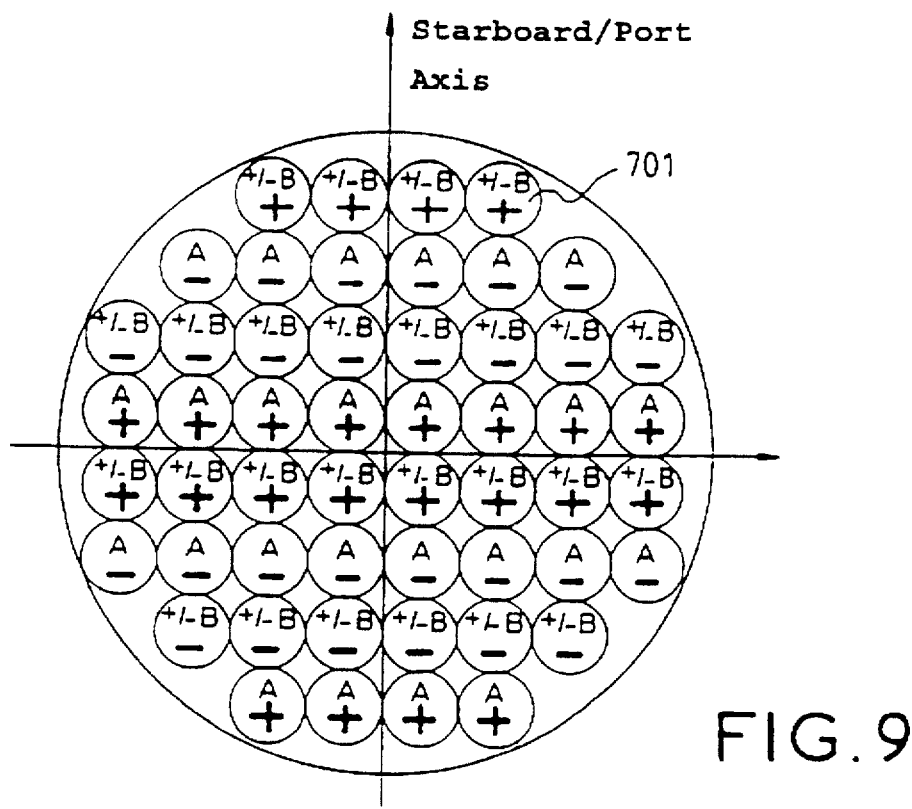
FIG. 9 a feed scheme for the antenna of FIG. 7 for obtaining starboard/port lobes.

Comparing the configurations of FIGS. 8 and 9, it is observed that when passing from one to the other, depending on the transducers, the following changes are obtained:

the polarity and electrical signal do not change, only the polarity does not change, only the applied signal does not change, the polarity and the applied signal both change.

The change of polarity of the transducers normally corresponds to a switching of the connection leads to which it is wired, it being highly desirable to avoid this. This result can be achieved simply by modifying the sign of the signals A and B applied to these transducers so as successively to recover the two one-dimensional configurations.

Figures 10, 11:
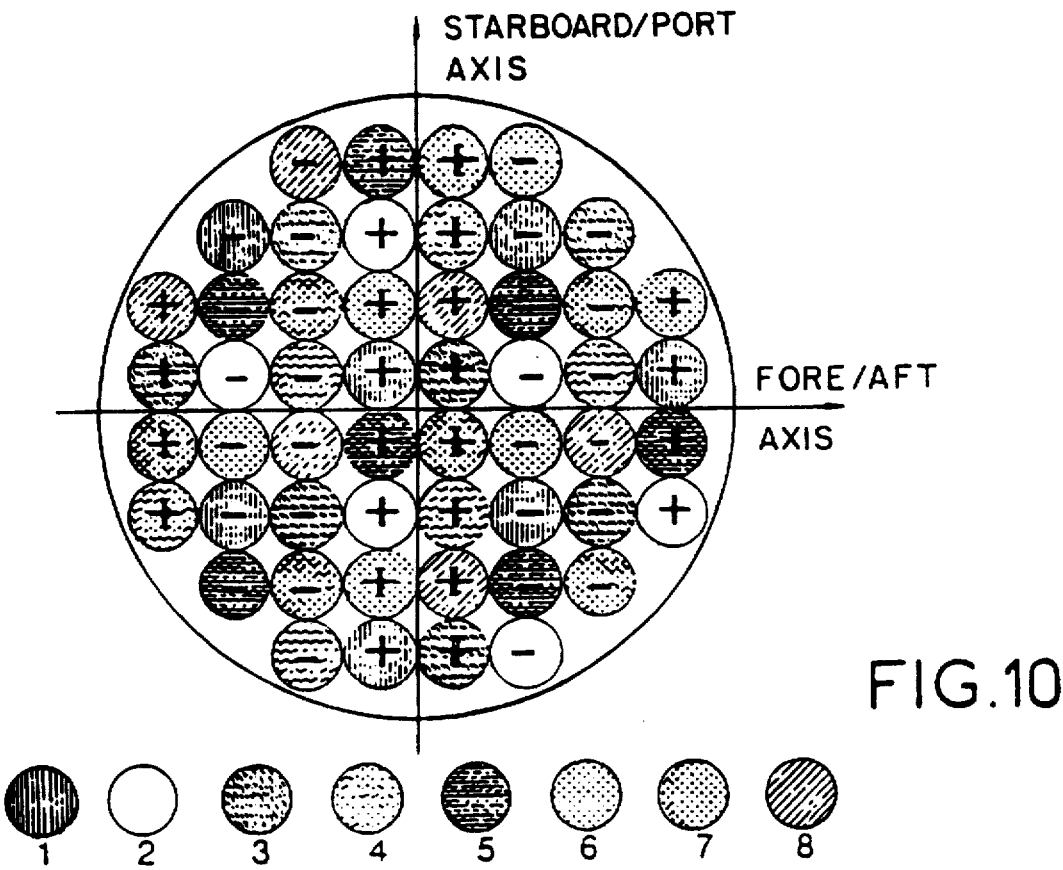
FIG. 10 a feed scheme for the antenna of FIG. 7 for obtaining fore/aft and starboard/port lobes.
FIG. 11 a table of the feed mode for the distribution of FIG. 10.

An overview of this result can be represented in a simple graphical manner in FIG. 10 with reference to the table of FIG. 11. In FIG. 11, signals at frequency F2 (A'/B') are distinguished by a prime mark from signals at frequency F1 (A/B).

It is observed that the transducers are distributed into 8 groups according to the polarity and the signal which must be applied to them to obtain, by choice, the two beams, fore/aft or starboard/port. These groups numbered 1 to 8 are identified in the figure by a distinct frame. Therefore, to obtain the successive emission of the two beams, fore/aft and starboard/port, electrical signals corresponding to frequencies F1 or F2, with phases defined by A/B or A'/B' according to the definition seen in the case of the one-dimensional system, are applied to the transducers in a succession of four pulses corresponding to the distribution of frequencies and polarities given in the table of FIG. 11. Thus, pulse 1 will correspond to a frequency F1 whose signals A will be applied to the transducers belonging to groups 1, 2, 5 and 6 and the signals B to the transducers corresponding to groups 3, 4, 7 and 8. The second pulse is at the frequency F2 (A' and B') and is applied to the transducers according to the distribution of the second column of the table, and so on etc.

A fore beam at the frequency F1, an aft beam at the frequency F2, a starboard beam at the frequency F1 and a port beam at the frequency F2 are therefore obtained successively in this manner.

As in the one-dimensional case, these beams are emitted successively within a short time span and the system then awaits the reception of the various echoes suffering a Doppler shift due to the speed.

When these echoes return, they should be separated. By taking the direct sum of all the signals recieved on the sensors, two symmetrical lobes are formed, inclined at +/−α as the emission lobes on the fore/aft axis. The formation of these beams at reception makes it possible in particular to eliminate in large part the beams corresponding to the starboard/port emissions. Moreover, discrimination between the echoes originating from the fore and aft directions is carried out as in the one-dimensional case through the difference of the frequencies which are chosen to be sufficiently distinct for the Doppler shift not to give rise to confusion.

Figure 12:
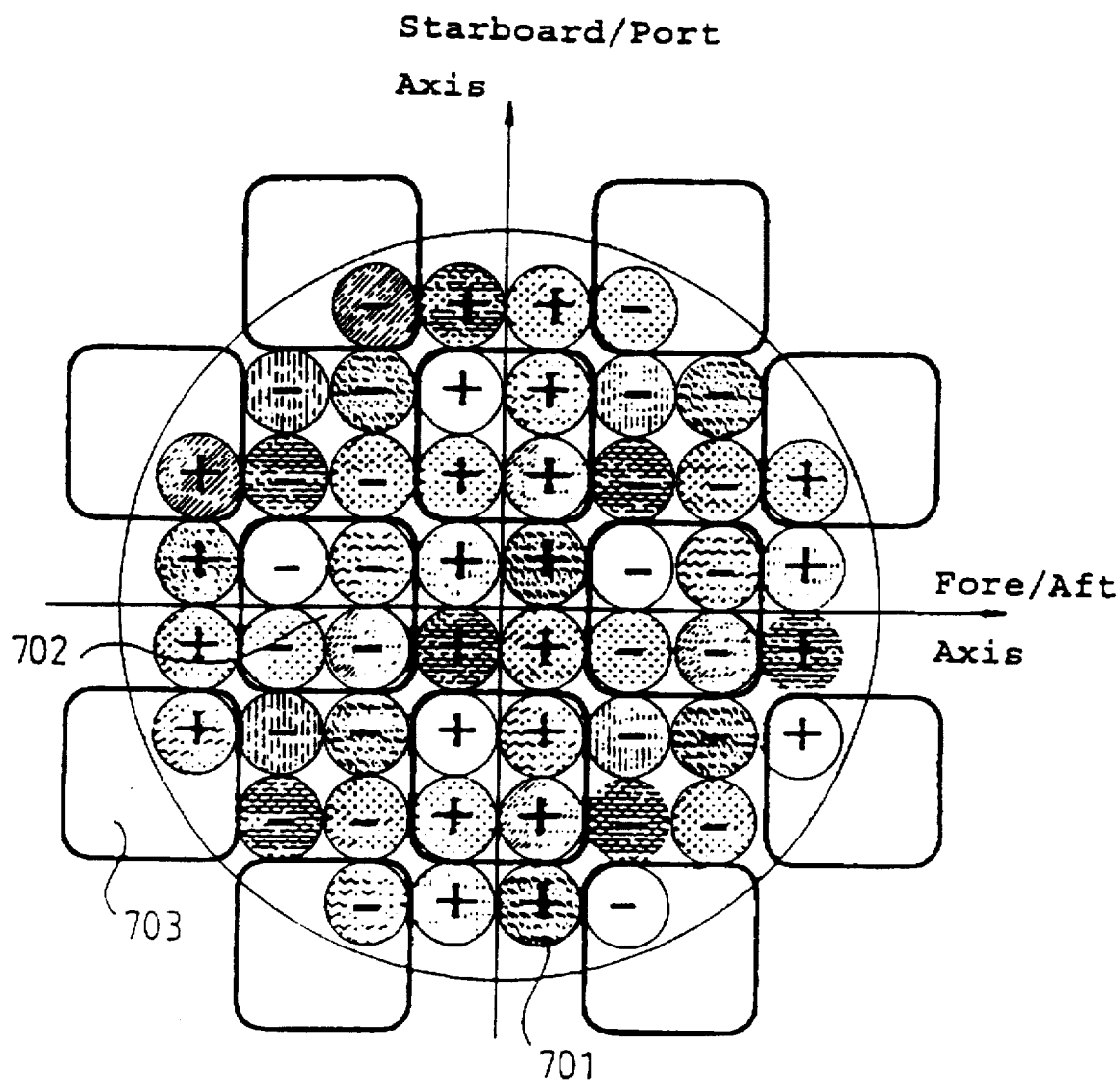
FIG. 12 a distribution of the connections of the transducers of the antenna of FIG. 7 in the fore/aft and starboard/port reception mode.

To receive the echoes corresponding to the starboard/port emission beams, it is preferable here again to form two symmetrical lobes on the starboard/port axis so as to eliminate the echoes at the same frequency corresponding to the fore/aft axis. To do this, in the operation of summing the signals from the transducers, the polarity of certain transducers must be inverted. As represented in FIG. 12, this inversion of polarity relates to the transducers assembled into super-groups of four contiguous transducers belonging to the groups 2, 4, 6 and 8, such as the super-group 702 in this FIG. 12. The same should also be done for the super-groups which are incomplete, such as super-group 703, but which would comprise four transducers corresponding to the definition of a super-group if the array formed by the set of transducers of the antenna were larger and extended in such a way that these super-groups were full.

The starboard/port reception beams being thus formed, separation of the echoes corresponding to the emission to starboard or to port is carried out by distinguishing between the reception frequencies, as for the fore/aft echoes.

Figure 13:
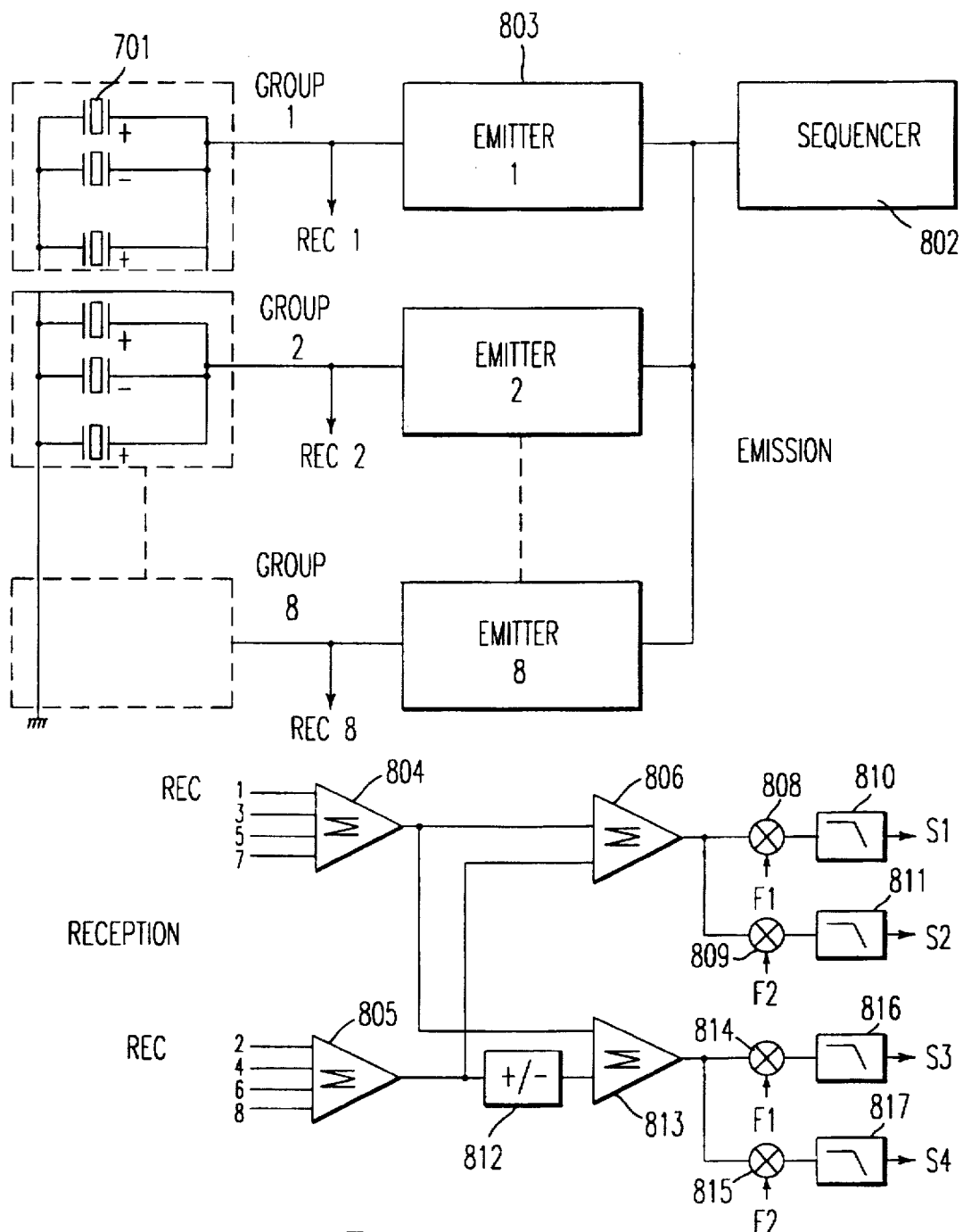
FIG. 13 a schematic layout of an emission/reception system adapted to the antenna of FIG. 7.

The schematic layout of a system allowing emission and reception with such an antenna is represented in FIG. 13.

The transducers 701 are assembled into eight groups corresponding to those defined in FIG. 10. These groups are fed respectively by eight emitters 803 which contain, as in FIG. 6, a PROM memory in which the signals to be emitted are stored, followed by a digital/analog converter and by a power amplifier. The signals stored in the memory correspond to the sequences defined in the table of FIG. 11. These emitters all operate under the timing of a sequencer 802.

At the reception end, the transducers of groups 1, 3, 5 and 7 are linked to a summing unit 804 and those of groups 4, 6 and 8 to a summing unit 805. A third summing unit 806 makes it possible to assemble the outputs from the first two summing units to obtain the fore and aft reception signal. This signal is demodulated in two mixers 808 and 809 fed respectively with the frequencies F1 and F2. The baseband signals thus obtained are filtered by low-pass filters 810 and 811 which deliver the output signals S1 and S2 corresponding to the echoes in the fore and aft pathways.

The signal output by the summing unit 805 is inverted in an inverter 812, and then applied to a summing unit 813 which also receives the signal output by the summing unit 804. The signal from the starboard/port pathways is thus obtained and is demodulated in mixers 814 and 815 which receive the frequencies F1 and F2 respectively. The baseband signals thus obtained are filtered in low-pass filters 816 and 817 in order to obtain the output signals S3 and S4 corresponding to the echoes in the port and starboard pathways.

The advantages obtained are the same as in the one-dimensional case and it may be added that as compared with a conventional antenna including four groups of transducers inclined along the four pathways to be obtained, a reduction of around one third is obtained in the diameter of the antenna.

According to a variant embodiment, the same frequency F is used for the two successive emission pulses. To separate the directions on reception, pathways aimed in the directions ±α are formed, giving the reception signals. To do this, the phase law sequences are applied as at emission and separation is therefore now spatial instead of frequential.

I claim:

1. A sonar system for current meter and doppler log, comprising:

a set of transducers situated on a base in a base plane;

a feed device for feeding said set of transducers with signals exhibiting a first and second frequency at distinct phases to obtain in at least a first emission plane perpendicular to said base plane, a first emission lobe at the first frequency forming an angle α with a perpendicular to said base plane and a second emission lobe at the second frequency forming an angle −α with said perpendicular; and a summation device for performing summation of signals received by the transducers to obtain a first reception signal comprising signals at said first and second frequencies in said first emission plane;

wherein:
   said set of transducers are aligned in rows and spaced apart by a predetermined distance,
   said rows are grouped into pairs of rows,
   each pair of rows has transducers of a common polarity; and
   adjacent of said pairs of rows of transducers have inverted polarities; and
   said feed device delivers signals A and B at a first frequency and 90° out of phase in a first sequence A, B, A, B . . . to alternating rows of transducers such that a row being fed signal A to each transducer of that row has at least one adjacent row being fed signal B to each transducer of said at least one adjacent row, and subsequently delivers signals A' and B' at a second frequency and 90° out of phase in a second sequence A', −B', A', −B' . . . to alternating rows of transducers such that a row being fed signal A' to each transducer thereof has adjacent rows being fed signal −B' to each transducer thereof, thereby determining said first and second emission lobes.

2. The system according to claim 1, wherein:
   said predetermined distance is equal to half a wavelength of a working frequency such that said angle α of said first and second emission lobes is equal to 30°.

3. The system according to claim 2, wherein:
   said set of transducers are arranged in an array symmetric with respect to a first axis and a second axis perpendicular to the first axis, the array also being symmetric with respect to diagonals of the first and second axes and aligned in rows parallel to the second axis, and said transducers are moreover distributed in first through eighth groups;

said signals A, B, and A', B' are delivered to the transducers distributed in said first through eighth groups by said feed device at the first frequency in a first sequence A, A, B, B, A, A, B, B, such that the first, second, fifth and sixth groups are fed signal A, and the third, fourth, seventh, and eighth groups are fed the signal B, and then subsequently at the second frequency in a second sequence A', A', −B', −B', A', A', −B', −B', such that the first, second, fifth, and sixth groups are fed the signal A', and the third, fourth, seventh, and eighth groups are fed the signal −B', and then at the first frequency in a third sequence A, −A, A, −A, B, −B, B, −B, such that the first and third groups are fed the signal A, the second and fourth groups are fed the signal −A, the fifth and seventh groups are fed the signal B, and the sixth and eighth groups are fed the signal −B, and then at the second frequency in a fourth sequence A', −A', A', −A', −B', B', −B', B', such that the first and third groups are fed the signal A', the second and fourth groups are fed the signal −A', the fifth and seventh groups are fed the signal −B', and the sixth and eighth groups are fed the signal B', thereby obtaining said first and second emission lobes in a plane containing the first axis, and obtaining third and fourth emission lobes in a second emission plane perpendicular to said base plane and containing the second axis; and said summation device further performing summation on signals received by the transducers to obtain a second reception signal comprising signals at said first and second frequencies in the second emission plane.

4. The system according to claim 3, wherein:
   the transducers are associated in supergroups, each supergroup comprising one transducer each of the second, fourth, sixth, and eighth groups, and each transducer of each supergroup is adjacent to two other transducers of the same supergroup and diagonal to a third transducer of the same supergroup;

said summation device +/− inverts signals received by transducers of the supergroups and performs direct addition of the inverted signals along with signals received by each remaining transducer to obtain said second reception signal; and said summation device performs direct addition of signals received by all of the transducers to obtain said first reception signal.

5. The system according to claim 4, wherein each transducer is separated from adjacent transducers by a spatial distance equal to half a wavelength of the working frequency, thereby inclining the four emission lobes by 30° with respect to said perpendicular.

6. The system according to claim 5, wherein the transducers are round and distributed inside a circle.

* * * * *